United States Patent
Kabeya et al.

(10) Patent No.: US 10,380,177 B2
(45) Date of Patent: Aug. 13, 2019

(54) EXPANSION OF A QUESTION AND ANSWER DATABASE

(71) Applicant: INTERNATIONAL BUSINESS MACHINES CORPORATION, Armonk, NY (US)

(72) Inventors: Yoshinori Kabeya, Kawasaki (JP); Toru Nagano, Tokyo (JP); Masayuki Suzuki, Tokyo (JP); Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 14/957,139

(22) Filed: Dec. 2, 2015

(65) Prior Publication Data

US 2017/0161378 A1    Jun. 8, 2017

(51) Int. Cl.

| | |
|---|---|
| *G06F 16/632* | (2019.01) |
| *G06F 16/635* | (2019.01) |
| *G06F 16/638* | (2019.01) |
| *G06F 16/683* | (2019.01) |
| *G10L 15/22* | (2006.01) |
| *G06F 16/332* | (2019.01) |

(52) U.S. Cl.
CPC ........ *G06F 16/634* (2019.01); *G06F 16/3329* (2019.01); *G06F 16/637* (2019.01); *G06F 16/638* (2019.01); *G06F 16/683* (2019.01); *G10L 15/22* (2013.01)

(58) Field of Classification Search
None
See application file for complete search history.

(56) References Cited

U.S. PATENT DOCUMENTS

| | | | |
|---|---|---|---|
| 6,724,887 B1 * | 4/2004 | Eilbacher | H04M 3/5183 379/265.02 |
| 8,811,593 B1 | 8/2014 | Morrissey | |
| 2008/0195378 A1 * | 8/2008 | Nakazawa | G06F 17/30654 704/9 |

(Continued)

FOREIGN PATENT DOCUMENTS

| | | |
|---|---|---|
| JP | 2012038704 A | 2/2012 |
| JP | 2012003704 | 5/2012 |

OTHER PUBLICATIONS

Fujita, Y. et al., "Out-of-Task Utterance Detection Based on Bag-of-Words Using Automatic Speech Recognition Results," Asia-Pacific Signal and Information Processing Association Annual Summit and Conference, Oct. 2011. (pp. 1-4).

(Continued)

*Primary Examiner* — Tuankhanh D Phan
(74) *Attorney, Agent, or Firm* — Tutunjian & Bitetto, P.C.; Vazken Alexanian

(57) ABSTRACT

A system and method for expanding a question and answer (Q&A) database. The method includes preparing a set of Q&A documents and speech recognition results of an agent's utterances in conversations between an agent and a customer, each Q&A document in the set having an identifier, and each speech recognition result having an identifier common with the identifier of a relevant Q&A document, and adding one or more repetition parts extracted from the speech recognition results of the agent's utterances to a corresponding Q&A document in the set.

21 Claims, 15 Drawing Sheets

(56) References Cited

U.S. PATENT DOCUMENTS

2011/0010177 A1   1/2011  Nakano et al.
2015/0006261 A1*  1/2015  Gutman ........... G06Q 10/06393
                                                      705/7.39

OTHER PUBLICATIONS

Google Project Hosting, "Word2vec Tool for computing continuous distributed representations of words," Google Project Hosting, Nov. 2015, (pp. 1-5).

* cited by examiner

| F[x] | Q&A ID | Description |
|---|---|---|
| ... | | |
| 123 | Q&A_XXXX | <TITLE>Address change, Name change</TITLE><br><Q>How to change my address or name</Q><br><A>Have a WEB ID … Customer can change from the web, otherwise go to a branch with ID</A> |
| 124 | Q&A_YYYY | <TITLE>Online ID change</TITLE><br><Q>How to change my online ID</Q><br><A>Call a free dial xxxx-xxxx. The caller must be account owner. Prepare account number, hints. </A> |
| 125 | Q&A_ZZZZ | <TITLE>Open account for under eighteen</TITLE><br><Q>How to open an account for under 18</Q><br><A>Customers under 18 needs a written approval of parents. An approval document can be downloaded from the website, or call xxxx-xxxx to get the document. </A> |
| ... | | |
| 295 | Q&A_AAAA | <TITLE>Lost credit card / Reissue credit card</TITLE><br><Q>I lost credit card. How to stop my credit card.</Q><br><A>Call a free dial zzzz-zzzz. Listen an instruction, and input your second pass code. … After that, tell the incident to the police. </A> |

| C[i] | Speech Recognition Results [i] (Agent's utterances) | Q&A ID 511 |
|---|---|---|
| 1 | 1 HELLO THANK YOU FOR CALLING XXXX CALL CENTER. 2 MAY I HELP YOU. 3 WE UNDERSTAND OK. 4 .... 5 I UNDERSTAND. OK. D_AH YOU'VE ALREADY MOVED TO NEW ADDRESS. OK. D_AH YOU WANT TO KNOW THE NEW BRANCH CLOSE TO YOUR NEW ADDRESS. YOU LOST THE PASSWORD AND YOU WANT TO REISSUE THE PASSWORD. | Q&A_AAAA |
| ... | ... | |
| 497 | 23 OKAY. YOU LOST CREDIT CARD. YOU MAY LOST CREDIT CARD. THIS PROCEDURE IS STOP THE CARD FOR YOUR SAFETY TILL YOUR CARD WILL BE FOUND. IF YOU PREFER WE INVALIDATE YOUR CARD NOW AND START TO ISSUE NEW CARD. | Q&A_AAAA |
| ... | ... | |
| 498 | 12 OKAY. YOU FOUND THE CARD THAT WE'VE STOPPED SINCE YOU WANT TO REVALIDATE CARD. IT' OK FOR YOU WE UNDERSTAND. YOU APPLIED THE CARD. BUT YOU CAN'T RECEIVE THE CARD. YOU MOVED. BUT YOUR CARD HAS NOT BEEN RETURNED. LET ME CHECK THE HISTORY OF THE PROCEDURE. 13 YOUR HISTROY HAS FOUND. ACCORDING TO THE LOG THAT WE HAVE. YOU HAVE ALREADY RECEIVED. | Q&A_AAAA |
| 499 | 8 OKAY. YOU WANT TO MAKE AN ACCOUNT FOR YOUR DAUGHTER. | Q&A_ZZZZ |
| ... | ... | |
| 500 | 15 WE ACCEPTED THE CARD. YOU CAN'T FIND THE CARD. YOU WANT TO STOP THE SERVICE TO THE CARD. NOW WE START THE PROCEDURE TO STOP YOUR CARD. IT MAY TAKE EFFECT IN ONE HOUR. ... 431 YOU'RE WELCOME. SORRY FOR YOUR INCONVENIENCE. 432 ENYTHING ELSE. OK. THANK YOU GOOD BYE. | Q&A_AAAA |

512: row 1
513: rows 497–500

| F[x] | Q&A ID | Description |
|---|---|---|
| ... | | |
| 201 | Q&A_aaaa | <TITLE>Wire transfer to a company (typeA)</TITLE> |
| 202 | Q&A_bbbb | <TITLE>Wire transfer to a company (typeB)</TITLE> |
| 203 | Q&A_cccc | <TITLE>Wire transfer to a person who has X account</TITLE> |
| ... | | |
| 211 | Q&A_dddd | <TITLE>Paying consumption tax</TITLE> |
| 212 | Q&A_eeee | <TITLE>Paying auto tax</TITLE> |
| 213 | Q&A_ffff | <TITLE>Paying fixed property tax</TITLE> |
| ... | | |

521

522: 201, 202, 203
523: 211, 212, 213

| No. | Associated Q&A documents |
|---|---|
| 1 | 201,202,203 |
| 2 | 211,212,213 |

| R[k] | Rule |
|---|---|
| 1 | I UNDERSTAND (.*) <END_OF_SENTENCE> |
| 2 | LET ME CONFIRM THAT (.*) <END_OF_SENTENCE> |
| 3 | YOU WANT TO (.*) <END_OF_SENTENCE> |
| 4 | YOU SAID THAT YOU (.* WHEN .*) <END_OF_SENTENCE> |
| ... | |
| n | |

541
```
Q&A_AAAA
<TITLE>Lost credit card / Reissue credit card</TITLE>
<Q>I lost credit card. How to stop my credit card.</Q>
<A>Call a free dial zzzz-zzzz. Listen an instruction, and input your second pass code. ... After that, tell the incident to the police.
```
F

542
```
Q&A_AAAA
<TITLE>Lost credit card / Reissue credit card</TITLE>
<Q>I lost credit card. How to stop my credit card.</Q>
<A>Call a free dial zzzz-zzzz. Listen an instruction, and input your second pass code. ... After that, tell the incident to the police.
<HIDDEN>
I UNDERSTAND . OK . D_AH YOU'VE ALREADY MOVED TO NEW ADDRESS . OK . D_AH YOU WANT TO KNOW THE NEW BRANCH CLOSE TO YOUR NEW ADDRESS . YOU LOST THE PASSWORD AND YOU WANT TO REISSUE THE PASSWORD .
</HIDDEN>
```
F₁

543
```
Q&A_AAAA
<TITLE>Lost credit card / Reissue credit card</TITLE>
<Q>I lost credit card. How to stop my credit card.</Q>
<A>Call a free dial zzzz-zzzz. Listen an instruction, and input your second pass code. ... After that, tell the incident to the police.
<HIDDEN>
I UNDERSTAND . OK . D_AH YOU'VE ALREADY MOVED TO NEW ADDRESS . OK . D_AH YOU WANT TO KNOW THE NEW BRANCH CLOSE TO YOUR NEW ADDRESS . YOU LOST THE PASSWORD AND YOU WANT TO REISSUE THE PASSWORD .

OKAY . YOU LOST CREDIT CARD . YOU MAY LOST CREDIT CARD . THIS PROCEDURE IS STOP THE CARD FOR YOUR SAFETY . TILL YOUR CARD WILL BE FOUND . IF YOU PREFER WE INVALIDATE YOUR CARD NOW AND START TO ISSUE NEW CARD .

OKAY. YOU FOUND THE CARD THAT WE'VE STOPPED SINCE YOU WANT TO REVALIDATE CARD . IT' OK FOR YOU WE UNDERSTAND. YOU APPLIED THE CARD . BUT YOU CAN'T RECEIVE THE CARD . YOU MOVED . BUT YOUR CARD HAS NOT BEEN RETURNED . LET ME CHECK THE HISTORY OF THE PROCEDURE .

WE ACCEPTED THE CARD . YOU CAN'T FIND THE CARD . YOU WANT TO STOP THE SERVICE TO THE CARD . NOW WE START THE PROCEDURE TO STOP YOUR CARD . IT MAY TAKE EFFECT IN ONE HOUR .

</HIDDEN>
```
F₂

Fig. 6

```
601
Q&A_AAAA
<TITLE>Lost credit card / Reissue credit card</TITLE>
<Q>I lost credit card. How to stop my credit card.</Q>
<A>Call a free dial zzzz-zzzz. Listen an instruction, and input your second pass code. … After that, tell the incident to the police
```

```
602
Q&A_AAAA
<TITLE>Lost credit card / Reissue credit card</TITLE>
<Q>I lost credit card. How to stop my credit card.</Q>
<A>Call a free dial zzzz-zzzz. Listen an instruction, and input your second pass code. … After that, tell the incident to the police.
<HIDDEN>
HELLO THANK YOU FOR CALLING XXXX CALL CENTER .
MAY I HELP YOU .
WE UNDERSTAND OK .
…
I UNDERSTAND . OK . D_AH YOU'VE ALREADY MOVED TO NEW ADDRESS . OK . D_AH YOU WANT TO KNOW THE NEW
BRANCH CLOSE TO YOUR NEW ADDRESS . YOU LOST THE PASSWORD AND YOU WANT TO REISSUE THE PASSWORD .
…
OKAY . YOU LOST CREDIT CARD . YOU MAY LOST CREDIT CARD . THIS PROCEDURE IS STOP THE CARD FOR YOUR SAFETY
TILL YOUR CARD WILL BE FOUND . IF YOU PREFER WE INVALIDATE YOUR CARD NOW AND START TO ISSUE NEW CARD .
…
OKAY . YOU FOUND THE CARD THAT WE'VE STOPPED SINCE YOU WANT TO REVALIDATE CARD . IT' OK FOR YOU WE
UNDERSTAND . YOU APPLIED THE CARD . BUT YOU CAN'T RECEIVE THE CARD . YOU MOVED . BUT YOUR CARD HAS NOT
BEEN RETURNED . LET ME CHECK THE HISTORY OF THE PROCEDURE .
YOUR HISTROY HAS FOUND . ACCORDING TO THE LOG THAT WE HAVE . YOU HAVE ALREADY RECEIVED .
…
OKAY . YOU WANT TO MAKE AN ACCOUNT FOR YOUR DAUGHTER .
…
WE ACCEPTED THE CARD . YOU CAN'T FIND THE CARD . YOU WANT TO STOP THE SERVICE TO THE CARD . NOW WE START
THE PROCEDURE TO STOP YOUR CARD . IT MAY TAKE EFFECT IN ONE HOUR .
…
YOU'RE WELCOME . SORRY FOR YOUR INCONVENIENCE .
ANYTHING ELSE . OK . THANK YOU GOOD BYE .
</HIDDEN>
```

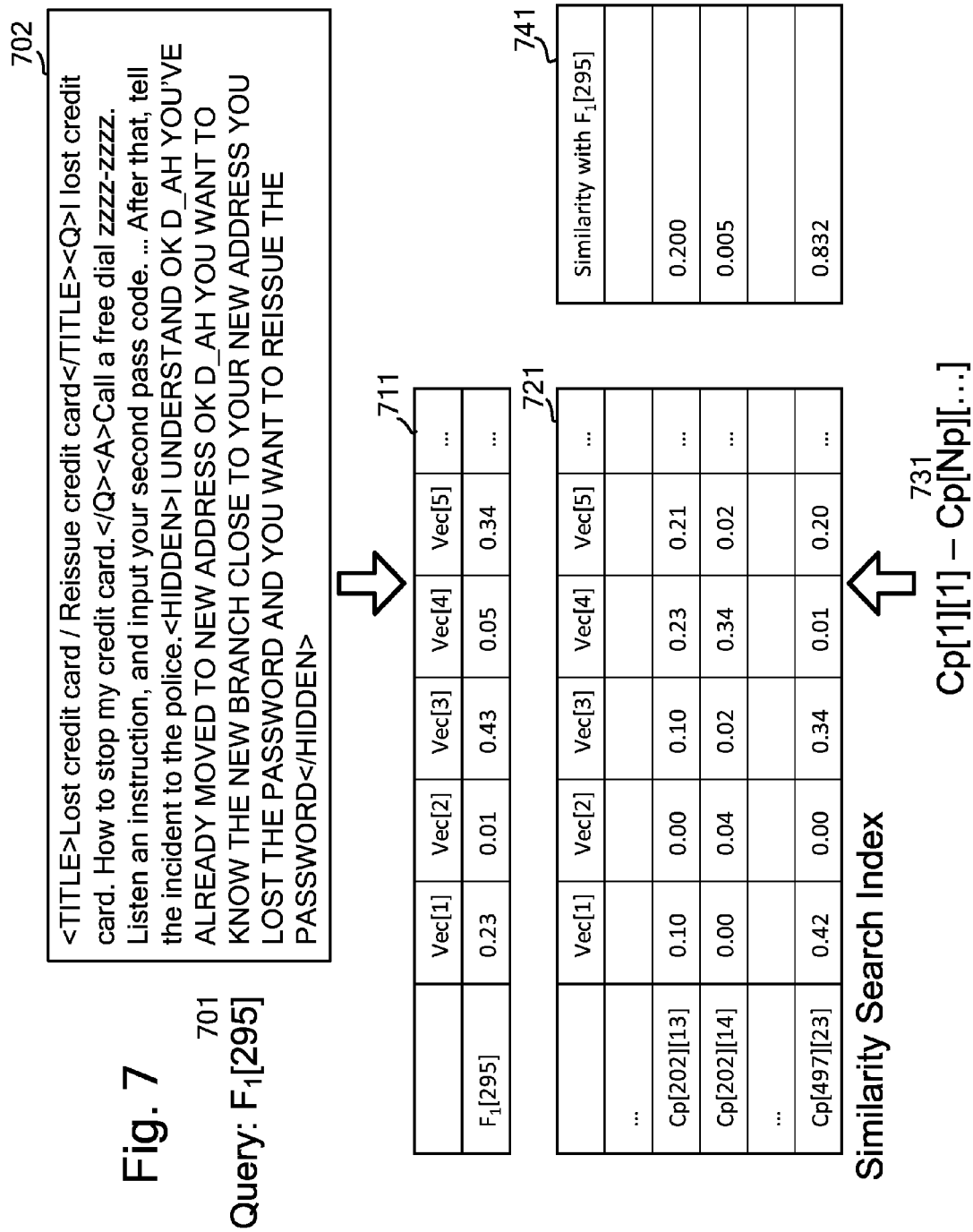

EXPANSION OF A QUESTION AND ANSWER DATABASE

BACKGROUND

Technical Field

The present invention relates to a question and answer (Q&A) database (QADB), and more specifically, to an expansion of the QADB.

Description of the Related Art

In contact centers of companies, it is required to answer to various questions from customers promptly for reducing cost and improving customer satisfaction. A call agent supporting system can transcribe conversations between a call agent and a customer using speech recognition system and search relevant and similar question and answer pairs from a database and, then, show the found pairs to the call agent.

In a case of Q&A search using a keyword search, such as Google® search, the Q&A system calculates similarity score of all Q&As and, then, returns a most relevant Q&A which has a highest similarity score.

For example, if the keywords for search are "address" and "change", the Q&A system searches for a most relevant Q&A among a set of the Q&A documents. Let us suppose that the set of the Q&A documents includes the following Q&A documents:

"Q&AXXXX Address change, Name change: Have a WEB ID . . . Customer can change from the web, otherwise go to a branch with ID" and "Q&AYYYY Online ID change: Call a free dial xxxx-xxxx. The caller must be an account owner. Prepare account number, hints". The Q&A having the identifier number, Q&AXXXX, comprises the terms, "Address change", and "Name change". Accordingly, the Q&A system returns the Q&A having the identifier number, Q&AXXXX, as a most relevant Q&A.

When we search for Q&A utilizing speech recognition results, a most relevant Q&A document is searched among a set of Q&A documents, utilizing speech recognition results as inputs. However, there is a difference between vocabulary of the speech recognition results and contents of the set of Q&A documents, because spoken terms and written terms do not always overlap.

For example, the speech recognition results are as follows: "do you want to open an account for your daughter?", "opening an account to eight year old boy . . . ". The contents of the set of the Q&A documents are as follows: "Q&A ZZZZ Open account for under eighteen year-olds". In the example mentioned above, the speech recognition results do not match the contents of the set of the Q&A documents, because representation manners for child is different from each other.

Accordingly, accuracy of the Q&A search is low, compared to a keyword search.

Speech recognition results are used to search for a new inquiry, which are not included in the existing Q&A set by classifying speech recognition results to existing Q&A (see Japanese Patent Laid-Open No. 2012/003704).

A query expansion is generally known as a method for preventing retrieval omission when a keyword does not match the contents of the set of the Q&A documents.

SUMMARY

According to one aspect of the present invention, an embodiment of the present principles provides a computer-implemented method for expanding a QADB. The method comprises preparing a set of Q&A documents and speech recognition results of at least an agent's utterances in conversations between the agent and a customer, each Q&A document in the set having an identifier, and each speech recognition result having an identifier common with the identifier of a relevant Q&A document, and adding one or more repetition parts extracted from the speech recognition results of the agent's utterances to a corresponding Q&A document in the set.

According to another aspect of the present invention, an embodiment of the present principles provides a computer comprising a computer readable storage medium storing a program of instructions executable by the computer to perform one or more methods described herein. The system comprises a memory storing a program which, when executed on a processor, performs a method for expanding a QADB. The method comprises preparing a set of Q&A documents and speech recognition results of at least an agent's utterances in conversations between the agent and a customer, each Q&A document in the set having an identifier, and each speech recognition result having an identifier common with the identifier of a relevant Q&A document, and adding one or more repetition parts extracted from the speech recognition results of the agent's utterances to a corresponding Q&A document in the set.

According to another aspect of the present invention, an embodiment of the present principles provides a computer program product comprising a computer readable storage medium storing a program of instructions executable by the computer system to perform one or more methods described herein. The method comprises preparing a set of Q&A documents and speech recognition results of at least an agent's utterances in conversations between the agent and a customer, each Q&A document in the set having an identifier, and each speech recognition result having an identifier common with the identifier of a relevant Q&A document, and adding one or more repetition parts extracted from the speech recognition results of the agent's utterances to a corresponding Q&A document in the set.

According to another aspect of the present invention, an embodiment of the present principles provides a computer-implemented method for searching for an answer to a question of a customer, based on conversations between an agent and the customer. The method comprises receiving, as input, a speech recognition result of the customer's question or an agent's response from the conversations, extracting a Q&A document to the customer's question or the agent's response from a QADB expanded according to the method described above, and displaying the extracted Q&A document to the agent.

According to another aspect of the present invention, an embodiment of the present principles provides a computer-implemented method for expanding a QADB. The method comprising preparing a set of Q&A documents and speech recognition results of agent's utterances in conversations between the agent and a customer, each Q&A document in the set having an identifier, and each Q&A document in the set having an identifier, and each speech recognition result having an identifier common with the identifier of a relevant Q&A document, and adding the speech recognition results of the agent's utterances to a corresponding Q&A document in the set.

According to another aspect of the present invention, an embodiment of the present principles provides a computer comprising a computer readable storage medium storing a program of instructions executable by the computer to perform one or more methods described herein. The system comprises a memory storing a program which, when executed on a processor, performs a method for expanding a QADB. The method comprises preparing a set of Q&A documents and speech recognition results of an agent's utterances in conversations between the agent and a customer, each Q&A document in the set having an identifier, and each Q&A document in the set having an identifier, and each speech recognition result having an identifier common with the identifier of a relevant Q&A document, and adding the speech recognition results of the agent's utterances to a corresponding Q&A document in the set.

According to another aspect of the present invention, an embodiment of the present principles provides a computer program product comprising a computer readable storage medium storing a program of instructions executable by the computer system to perform one or more methods described herein. The method comprises preparing a set of Q&A documents and speech recognition results of an agent's utterances in conversations between the agent and a customer, each Q&A document in the set having an identifier, and each Q&A document in the set having an identifier, and each speech recognition result having an identifier common with the identifier of a relevant Q&A document, and adding the speech recognition results of the agent's utterances to a corresponding Q&A document in the set.

According to an embodiment of the present invention, the expanded set of the Q&A documents provides an improved search result in the search process by searching a conversation between an agent and a customer.

BRIEF DESCRIPTION OF THE SEVERAL VIEWS OF THE DRAWINGS

FIG. 5A illustrates an embodiment of a QADB;

FIG. 5B illustrates an embodiment of call logs;

FIG. 5C illustrates an embodiment of associated identifiers of Q&A documents;

FIG. 5D illustrates an embodiment of rules for extracting repetition parts from speech recognition results;

FIG. 5E illustrates an embodiment of an original QADB and QADBs expanded according to an embodiment of the flowchart described in FIG. 2A;

FIG. 6 illustrates an embodiment of an original QADB and QADBs expanded according to an embodiment of the flowchart described in FIG. 3;

FIG. 7 illustrates an embodiment of calculating a similarity with the Q&A document, by using a similarity search index;

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To define more clearly the terms used herein, the following exemplified definitions are provided, but the meaning of the terms should be interpreted broadly as known to the technical field to which the present principles relates.

The term, a question and answer (Q&A), refers to listed question and answers. Q&As are compilations of information which are usually the results of certain questions constantly being asked. One embodiment of Q&A is Frequently Asked Questions (FAQ).

The term, a question and answer (Q&A) database (QADB), refers to a database for storing Q&As. The QADB includes a set of Q&A documents. One embodiment of QADB is Frequently Asked Questions (FAQ) database (FAQDB).

The term, "an agent", refers to a person who provides an answer to a question from a customer. The agent may be for example, but not limited to, a call agent, a call center agent, a system support agent or a customer support agent.

The term, "a customer", refers to a person who requests an answer to his or her question. The customer may be a customer of the agent defined above.

The term, "conversation", refers to an interactive or spontaneous communication between the agent and the customer. The conversation may be performed typically via a telephone communication, a web communication or a face-to-face communication.

Figure 1:
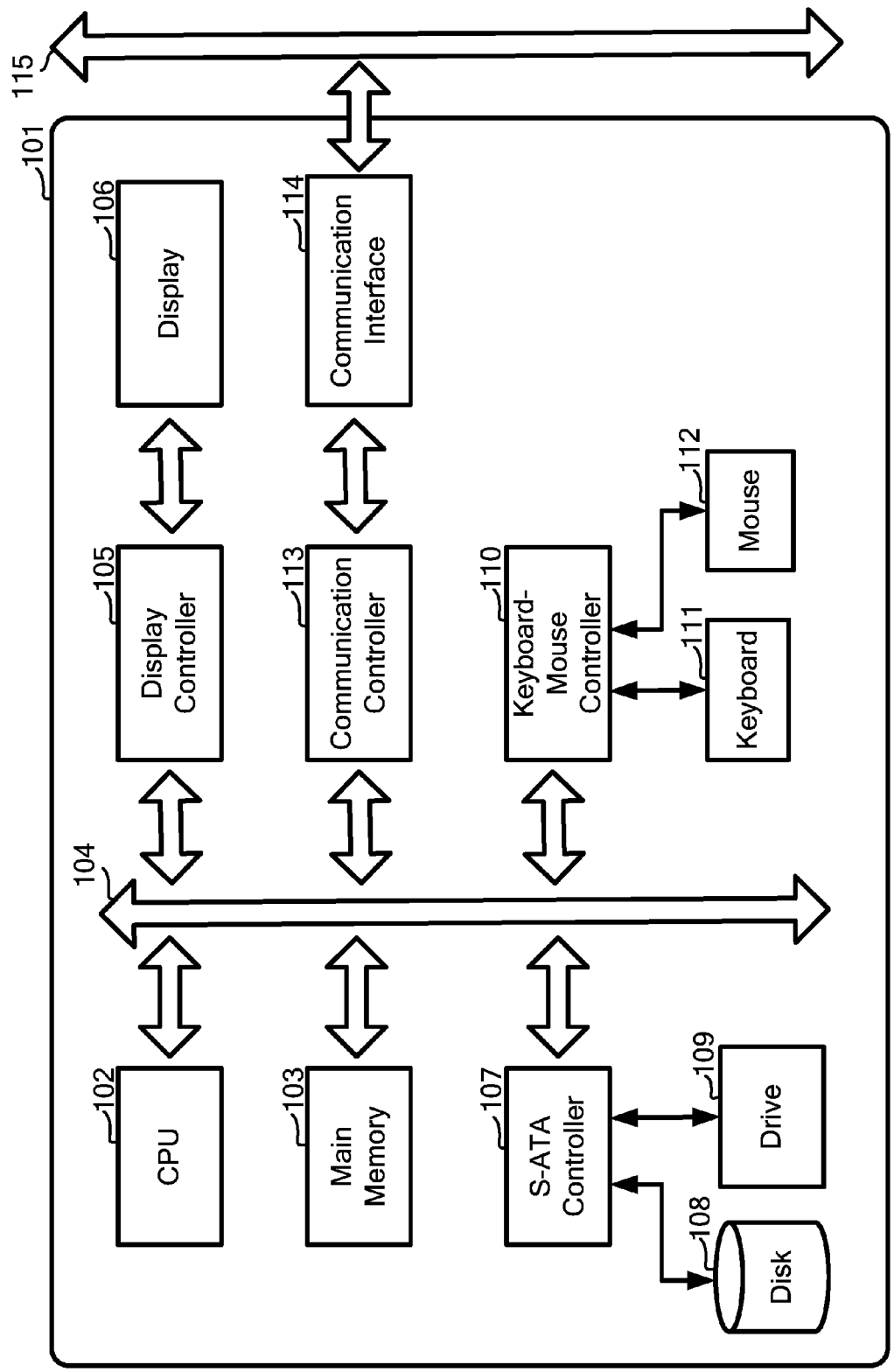
FIG. 1 illustrates an exemplified basic block diagram of a computer hardware used in an embodiment of the present invention.

With reference now to FIG. 1, FIG. 1 illustrates an exemplified basic block diagram of a computer hardware used in an embodiment of the present principles.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108), such as a hard disk or a solid state drive (SSD), and a drive (109), such as a CD, a DVD, or a Blu-ray disk (BD) drive, may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present principles, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Figure 2A:
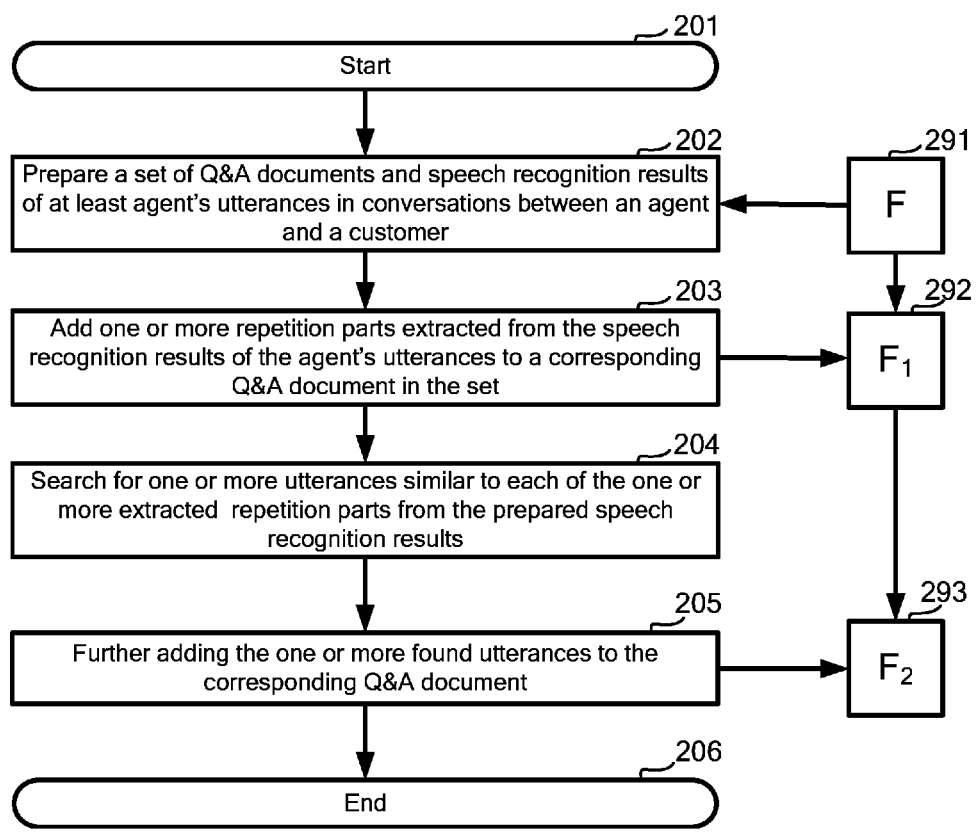
FIG. 2A illustrates one embodiment of an overall flowchart of a method for expanding a QADB.
Figure 2B:
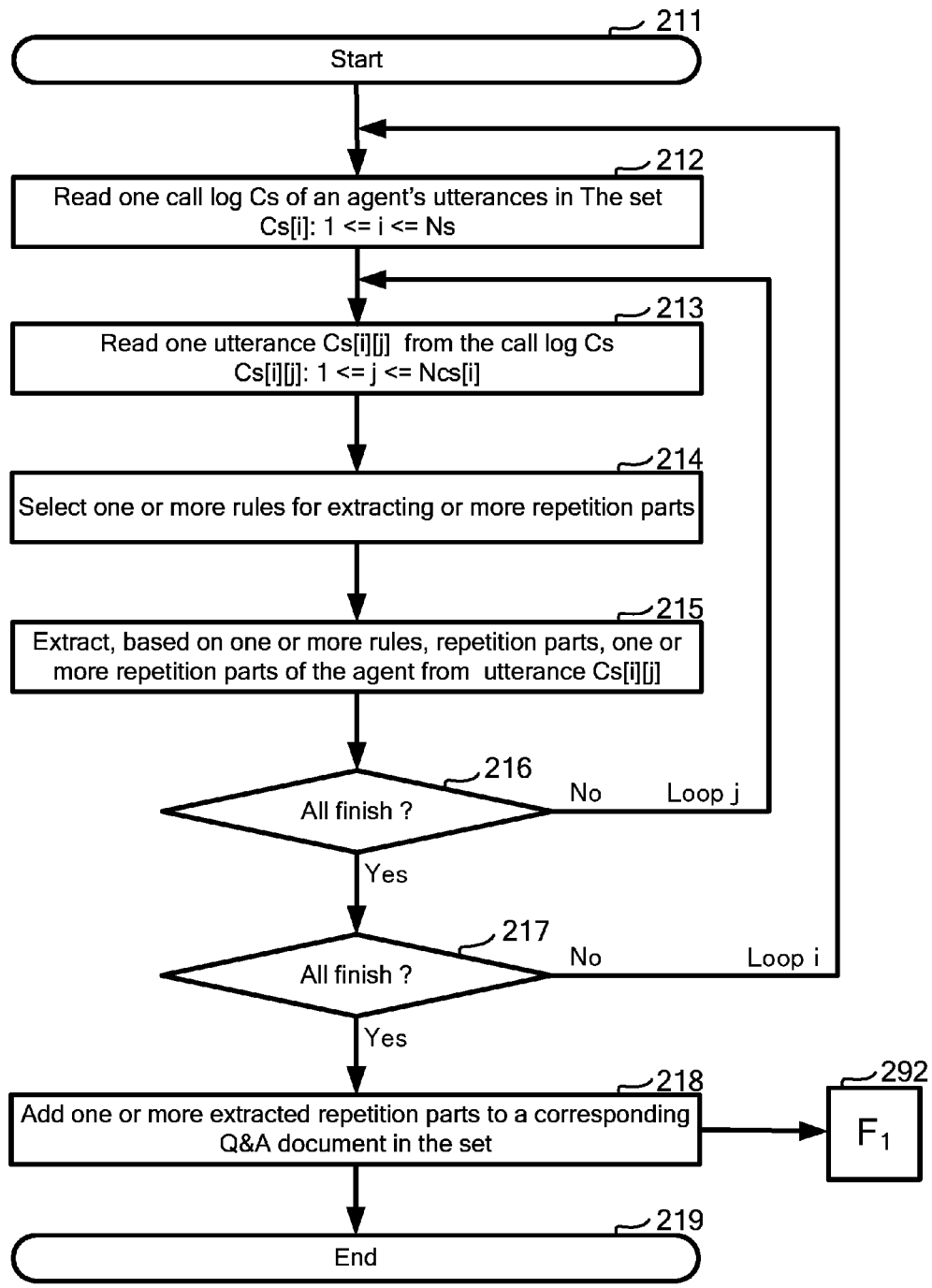
FIG. 2B illustrates an embodiment of a flowchart of a method for adding repetition parts to a Q&A document in the set.
Figure 2C:
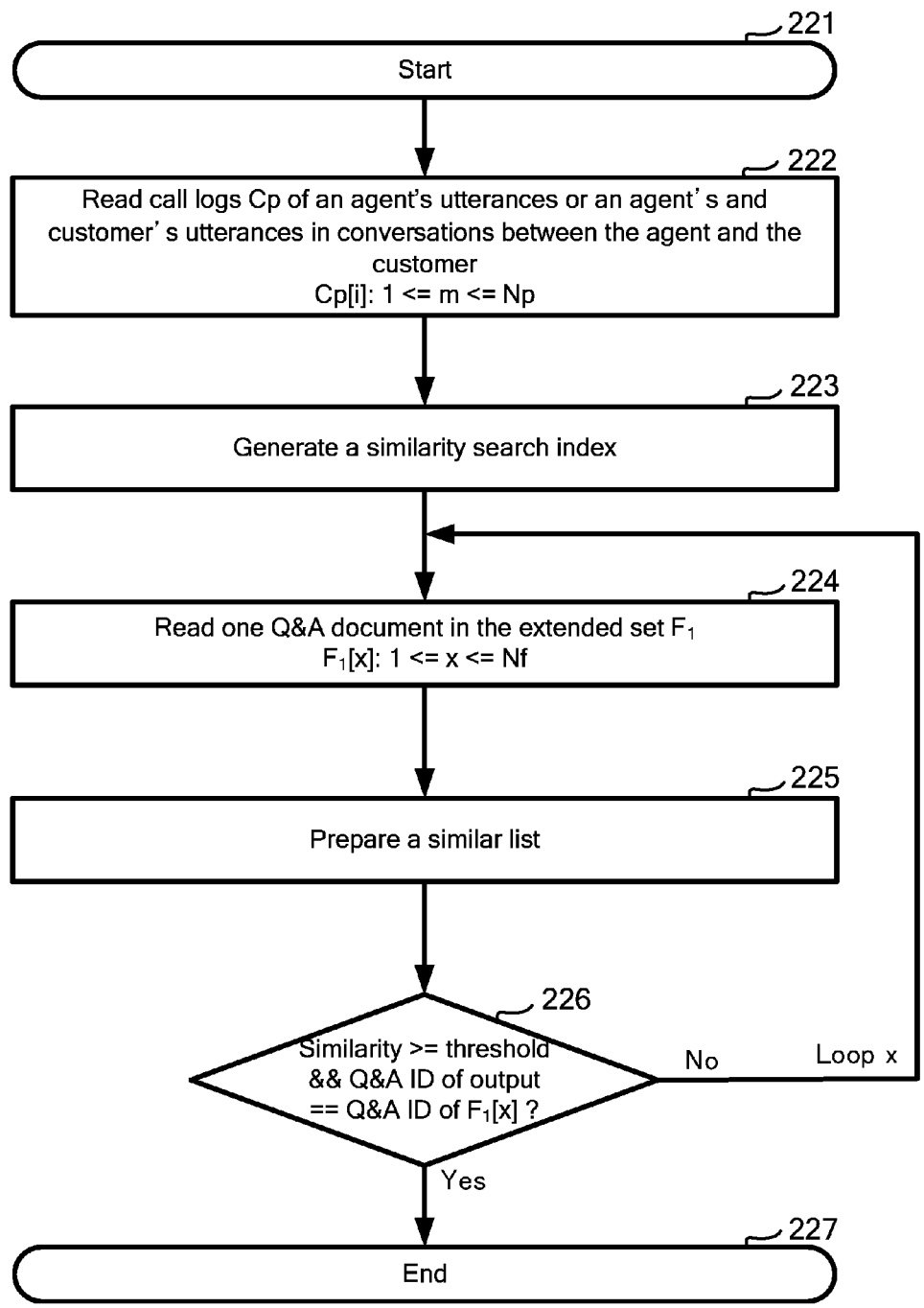
FIG. 2C illustrates an embodiment of a flowchart of a method for searching for an utterance similar to repetition parts.

FIGS. 2A to 2C illustrate one embodiment of flowchart of a method for expanding a QADB.

With reference now to FIG. 2A, FIG. 2A illustrates one embodiment of an overall flowchart of a method for expanding a QADB.

In step 201, the computer (101) starts the method mentioned above.

In step 202, the computer (101) prepares a set of Q&A documents, for example, by reading a QADB. The QADB comprises one or more of Q&A documents or a set of Q&A documents, F, (291). The set of Q&A documents may be represented as follows: F[x]: $1<=x<=N_f$, where $N_f$ refers to the total number of Q&A documents in the set of Q&A documents.

Each Q&A document in the set has a Q&A ID (namely, a Q&A identifier).

The set of Q&A documents may be prepared in advance prior to start of step 201. One embodiment of the QADB or the set of Q&A documents is illustrated in FIG. 5A described in further detail below.

In step 202, the computer (101) further prepares speech recognition results of at least an agent's utterances in conversations between an agent and a customer, for example, by reading one or more call logs Cs. The call logs Cs may be represented as follows: Cs[i]: $1<=i<=Ns$, where Ns refers to the total number of call logs Cs. The speech recognition results or utterances may be represented as follows: Cs[i][j]: $1<=j<=Ncs[i]$, where the Ncs[i] refers to the total number of utterances in the call log [i].

The call logs have two kinds: one is speech recognition results of an agent's conversation and another is speech recognition results of a customer's conversation. For example, in a call center, an agent's utterances and a customer's utterances are separately recorded in a respective channel, for example using two channels, namely right channel and left channel inputs. Accordingly, it is easy to collect the agent's utterances and the customer's utterances separately and, then, perform speech recognition of each utterance. Any speech recognition method known to the art can be used for preparing the agent's utterances and the customer's utterances.

Each call log (namely, each speech recognition result) has an identifier common with a Q&A ID of a relevant Q&A document. The relevant Q&A document may be a search result obtained by using the speech recognition result as input.

The call logs may be prepared in advance prior to start of step 201. One embodiment of the call logs is illustrated in FIG. 5B described in further detail below.

The call logs initially prepared may be divided into two sets: one set, Cs, is a set for extracting one or more repetition parts, as shown in step 203; and another set, Cp, is a set for searching for one or more utterances, as illustrated in step 204. The computer (101) may divide the call logs, according to the identifier, i, of each call log. For example, the computer may divide the call logs into two sets: C[0] to C[x−1] for Cs, and C[x] to C[y] for Cp, where $0<x<y$.

In step 203, the computer (101) adds one or more repetition parts extracted from the speech recognition results of the agent's utterances to a corresponding Q&A document in the set to generate an expanded set of the Q&A documents, $F_1$, (292).

The expanded set of the Q&A documents, $F_1$, (292), may be represented as follows: $F_1[x]$: $1<=x<=N_{f1}$, where $N_{f1}$ refers to the total number of the Q&A documents in the expanded set of the Q&A documents, $F_1$ (292).

The corresponding Q&A document has a Q&A ID common with an identifier of a call log from which the extracted repetition part was extracted or a Q&A ID common with an identifier associated with an identifier of a call log from which the extracted repetition part was extracted. Hereinafter, "an identifier of a call log from which the extracted repetition part was extracted" may be also referred to as "an identifier of the extracted repetition part".

When the corresponding Q&A document has a Q&A ID common with an identifier of the extracted repetition part, the identifier of the extracted repetition part is the same as an identifier of the call log from which the repetition part was extracted.

When the corresponding Q&A document has a Q&A ID common with an identifier associated with an identifier of the extracted repetition part, the identifier associated with an identifier of the extracted repetition part is the same as an identifier of a Q&A document which is searched from the set of the Q&A documents, F, (291), or an identifier of a call log which is searched from the call logs, by using the identifier of the extracted repetition part as a key. In the former case, the identifier of the extracted repetition part may be associated with an identifier of the Q&A document, from the view point of similarity of representation of the extracted repetition part. In the latter case, the identifier of the extracted repetition part may be associated with an identifier of the call log, from the view point of similarity of representation of the extracted repetition part.

The corresponding Q&A document is specified by a Q&A ID common with an identifier of the extracted repetition part or a Q&A ID common with an identifier associated with an identifier of the extracted repetition part, using, for example, a table for associated identifier of Q&A document in the set. One embodiment of the table is illustrated in FIG. 5C described in further detail below.

The extraction of one or more repetition parts may be performed manually or automatically. The repetition parts may include call logs of agent's utterances which are a repetition of customer's utterances, namely a customer's question. The agent's utterances may be the same or different wording of the customer's question.

The method for manually extracting one or more repetition parts may be performed by a computer according to an instruction of a person at an agent side. In an embodiment, an agent repeats contents of a user's question for safety. Accordingly, the person at the agent side can recognize the repetition part from the agent's utterances. The manually extracted repetition parts are added to a corresponding Q&A document in the set.

The method for automatically extracting one or more repetition parts is performed by the computer (101) or another computer different from the computer (101). The detailed explanation of automatically extracting one or more repetition parts is described in FIG. 2B discussed below.

After the addition described above, the computer (101) stores the expanded set of the Q&A documents, $F_1$, (292) into a storage, for example the disk (109). One embodiment of the expanded set of the Q&A documents, $F_1$, is illustrated in FIG. 5E described in further detail below.

The expanded set of the Q&A documents, $F_1$, (292) may be used for search process described in FIG. 4 discussed in further detail below. Therefore, by adding the repetition parts of the agent, if utterances of an agent or a customer in a search process is not similar to keywords in the set of Q&A documents, the utterances of an agent or a customer in a search process may have a possibility to be similar with the added repetition parts in the expanded set of the Q&A documents.

When the agent utterances are different wording of the customer's question, the agent's utterances may comprise a more precise keyword for searching Q&A documents relating to the customer's question in conversations between the agent and the customer, compared to the customer's question. For example, if the customer's question is "I would like to open an account for an eight age boy" or "need to open an account for younger daughter", the repetition parts of the agent's utterances may be "Do you want to open an account for an individual under eighteen?". The repetition parts comprise the keyword, "under eighteen", and, therefore, the repetition parts are more appropriate for searching Q&A documents relating to the customer's question in conversations between the agent and the customer, compared to the customer's questions comprising "eight age boy" or "younger daughter".

Accordingly, it is useful to utilize an expanded set of the Q&A documents, $F_1$, (292) for improving a search result in the search process. By adding the one or more repetition parts extracted from the speech recognition results of the agent's utterances to a corresponding Q&A document in the set, even if the utterance in the customer's utterances are not similar to the Q&A document set, the customer's utterances are similar to the repetition part in the agent's utterances. Accordingly, when a search for an answer to a question of a customer is performed using the expanded Q&A database, more appropriate Q&A documents can be extracted.

In optional step 204, the computer (101) searches for one or more utterances similar to each of the one or more extracted repetition parts from the prepared speech recognition results. The detailed explanation of searches for one or more utterances similar to each of the one or more extracted repetition parts is described in FIG. 2C discussed in further detail below.

In optional step 205, the computer (101) further adds the one or more found utterances to the corresponding Q&A document in the expanded set of the Q&A documents, $F_1$, (292) to generate an expanded set of the Q&A documents, $F_2$, (293). The corresponding Q&A document has a Q&A ID common with the identifier of the extracted utterance or an identifier associated with an identifier of the extracted utterance.

The expanded set of the Q&A documents, $F_2$, (293) may be used for a search method described in FIG. 4 as discussed in further detail below. The found utterances, which are similar documents corresponding to the extracted repetition parts, may expand the representation of the customer's request in a search process, and include a lot of paraphrases. Accordingly, it is useful to utilize an expanded set of the Q&A documents, $F_2$, (293) for improving a search result in the search process.

After the addition described above, the computer (101) stores the expanded set of the Q&A documents, $F_2$, (293) in a storage, for example the disk (109). An exemplary embodiment of the expanded set of the Q&A documents, $F_2$, is illustrated in FIG. 5E described in further detail below.

By adding the one or more found utterances to the corresponding Q&A document in the expanded set of the Q&A documents, this can expand the representation of the customer's requests and the expanded set of the Q&A documents includes a lot of paraphrases. Accordingly, when a search for an answer to a question of a customer is performed using the expanded Q&A database, more appropriate Q&A documents can be extracted.

In step 206, the computer (101) terminates the method described above.

With reference now to FIG. 2B, FIG. 2B illustrates an embodiment of a flowchart of a method for adding repetition parts to a Q&A document in the set.

In step 211, the computer (101) starts the method described above.

In step 212, the computer (101) reads one call log Cs[i] of an agent's utterances in the set of Cs. It is noted that the set of Cs, namely the agent's utterances, is used in the method for adding repetition parts to a Q&A document in the set.

In step 213, the computer (101) reads one utterance Cs[i][j] from the call log Cs[i] read in step 212.

In step 214, the computer (101) selects one or more rules for extracting a repetition part. The rules may be represented as follows: R[k]: 1<=k<=Nr, where Nr refers to the total number of rules. One embodiment of rules is illustrated in FIG. 5D described in further detail below.

In step 215, the computer (101) extracts, based on one or more rules for extracting one or more repetition parts, one or more repetition parts of the agent from utterance Cs[i][j].

In step 216, the computer (101) determines whether all of the utterances are processed or not. If the determination result is positive, the computer (101) proceeds to a step 216, while, if the determination result is negative, the computer (101) proceeds back to step 213 and repeats the method of steps 213 to 216.

In step 217, the computer (101) determines whether all of the call logs are processed or not. If the determination result is positive, the computer (101) proceeds to a step 218, while, if the determination result is negative, the computer (101) proceeds back to step 212 and repeats the method of steps 212 to 217.

The computer (101) obtains the extracted results p0. The extracted results p0 may be represented as follows: p0=list{C[i][j], Q&A ID}. For example, the extracted result p0 is Cs[1][5], Q&A_AAAA.

In step 218, the computer (101) adds one or more extracted repetition parts to a corresponding Q&A document with the same Q&A ID in the set to generate the expanded set of the Q&A documents, $F_1$, (292).

In step 219, the computer (101) terminates the method described above.

With reference now to FIG. 2C, FIG. 2C illustrates an embodiment of a flowchart of a method for searching for an utterance similar to repetition parts.

In step 221, the computer (101) starts the method described above.

In step 222, the computer (101) reads call logs Cp of an agent's utterances or an agent's and customer's utterances in conversations between the agent and the customer. The call logs Cp may be represented as follows: Cp[i]: 1<=m<=Np, where Np refers to the total number of call logs Cp.

In step 223, the computer (101) generates a similarity search index by a similarity search index builder. In the generation of the similarity search index, each log Cp[i][j] is converted into a vector representation, for example Vec [x]. The conversion may be performed by, for example, but not limited to, using a frequency of word in a log Cp[i][j], Term Frequency-Inverse Document Frequency (tf-idf), Latent Semantics Index (LSI) or word2vec (see the following URL:<https://code.google.com/p/word2vec/>).

In step 224, the computer (101) reads one Q&A document in the expanded set $F_1$, (292). The Q&A document is also converted into a vector representation, using the same method described in step 223.

In step 225, the computer (101) inputs the Q&A document as an input to prepare a similar list as an output, using a similarity search engine. One embodiment of the output may be represented as follows: Output: {Similarity, Cp[m][n], Q&A ID}. Examples of the output may be as follows: {0.832, Cp[497][23], Q&A_AAAA; 0.734, Cp[498][12], Q&A_AAAA; 0.722, Cp[499][8], Q&A_ZZZZ; 0.655, Cp[500][15], Q&A_AAAA; 0.200, Cp[202][13], Q&A_AAAA}.

The similarity may be determined by measuring a distance between the vector geneated in step 223 and the vector generated in step 224. The distance may be calculated by, for example, but not limited to, the cosine similarity. The cosine similarity is a method for measuring similarity between two vectors.

In step 226, the computer (101) determines whether or not the similarity of the output is equal or greater than a predetermined threshold and the Q&A ID of the output is common with the identifier of the extracted repetition parts.

Either of the following two methods may be used for the determination.

One method is first to search for one or more utterances having a similarity equal to or greater than a predetermined threshold value for each of the one or more extracted repetition parts from the prepared speech recognition results; and, then, to extract one or more utterances which have an identifier common with the identifier of each of the one or more extracted repetition parts from the one or more found utterances having a similarity equal to or greater than the predetermined threshold value.

Another method is first to extract one or more utterances which have an identifier common with the identifier of each of the one or more extracted repetition parts from the prepared speech recognition results; and, then, to search for one or more utterances having a similarity equal to or greater than a predetermined threshold value for each of the one or more extracted repetition parts.

If the determination result is positive, the computer (101) proceeds to a step 227, while, if the determination result is negative, the computer (101) proceeds back to step 224 and repeats the method of steps 224 to 226.

When the positive determination is obtained, examples of the output in step 226 may be as follows: {0.832, Cp[497][23], Q&A_AAAA; 0.734, Cp[498][12], Q&A_AAAA; 0.655, Cp[500][15], Q&A_AAAA}, when the predetermined threshold is set to 0.600 and the identifier of the extracted repetition part is Q&A_AAAA.

In step 227, the computer (101) terminates the method described above.

One embodiment of calculating a similarity with the Q&A document, by using a similarity search index, is illustrated in FIG. 7 described in further detail below.

Through the method described in FIG. 2C, the computer (101) obtains the one or more found utterances. As described in step 205 described in FIG. 2A, the computer (101) further adds the one or more found utterances to the corresponding Q&A document in the expanded set of the Q&A documents, $F_1$, (292) to generate an expanded set of the Q&A documents, $F_2$, (293). The expanded set of the Q&A documents, $F_2$, (293) may be represented as follows: $F_2$ [x]: 1<=x<=$N_{f2}$, where $N_{f2}$ refers to the total number of Q&A documents in the expanded set of the Q&A documents, $F_2$, (293).

Figure 3:
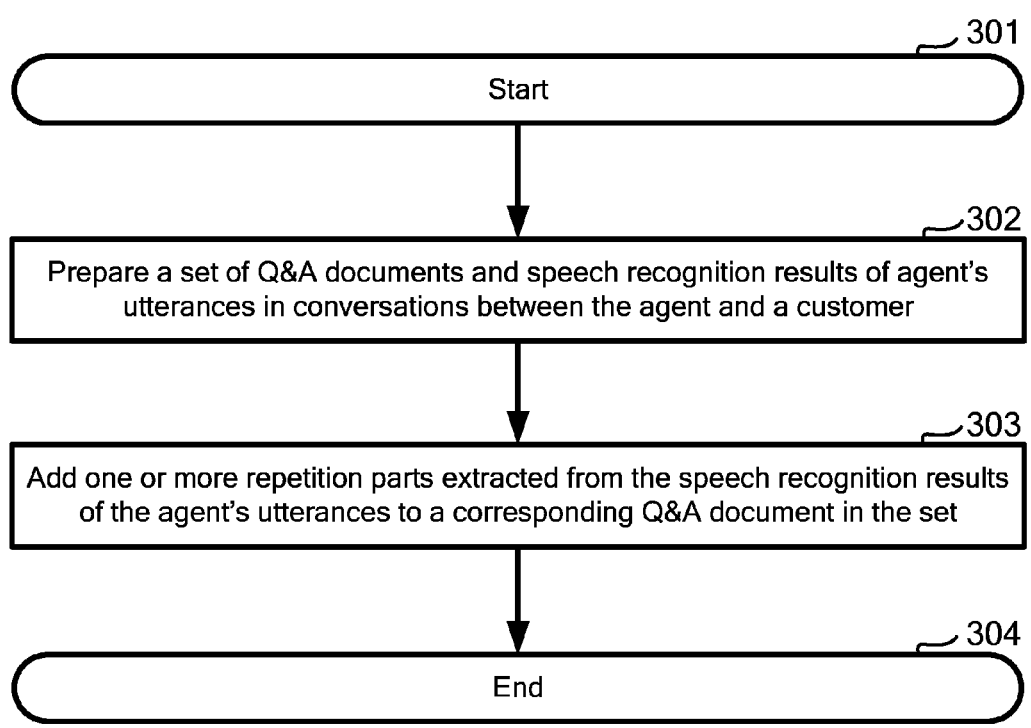
FIG. 3 illustrates another embodiment of an overall flowchart of a method for expanding a QADB.

FIG. 3 illustrates another embodiment of an overall flowchart of a method for expanding a QADB.

In step 301, the computer (101) starts the method described above.

In step 302, the computer (101) prepares a set of Q&A documents, for example, by reading a QADB. The QADB comprises one or more of Q&A documents or a set of Q&A documents.

The set of Q&A documents may be prepared in advance prior to start of step 301. One embodiment of the QADB or the set of Q&A documents is illustrated in FIG. 5A as described in further detail below.

In step 302, the computer (101) further prepares speech recognition results of an agent's utterances in conversations between the agent and a customer, for example, by reading one or more call logs. It is noted that the agent's utterances are used in the method described in FIG. 3.

The call logs may be prepared in advance prior to start of step 301. One embodiment of the call logs is illustrated in FIG. 5B described in further detail below.

In step 303, the computer (101) adds all or substantially all of the speech recognition results of the agent's utterances to a corresponding Q&A document in the set to generate an expanded set of the Q&A documents. By adding the all or substantially all of the speech recognition results of the agent's utterances to a corresponding Q&A document in the set, the expanded set of the Q&A documents can have more appropriate keywords which are comprised in agent's utterances. Accordingly, when a search for an answer to a question of a customer is performed using the expanded Q&A database, more appropriate Q&A documents can be extracted.

In step 304, the computer (101) terminates the method described above.

Figure 4:
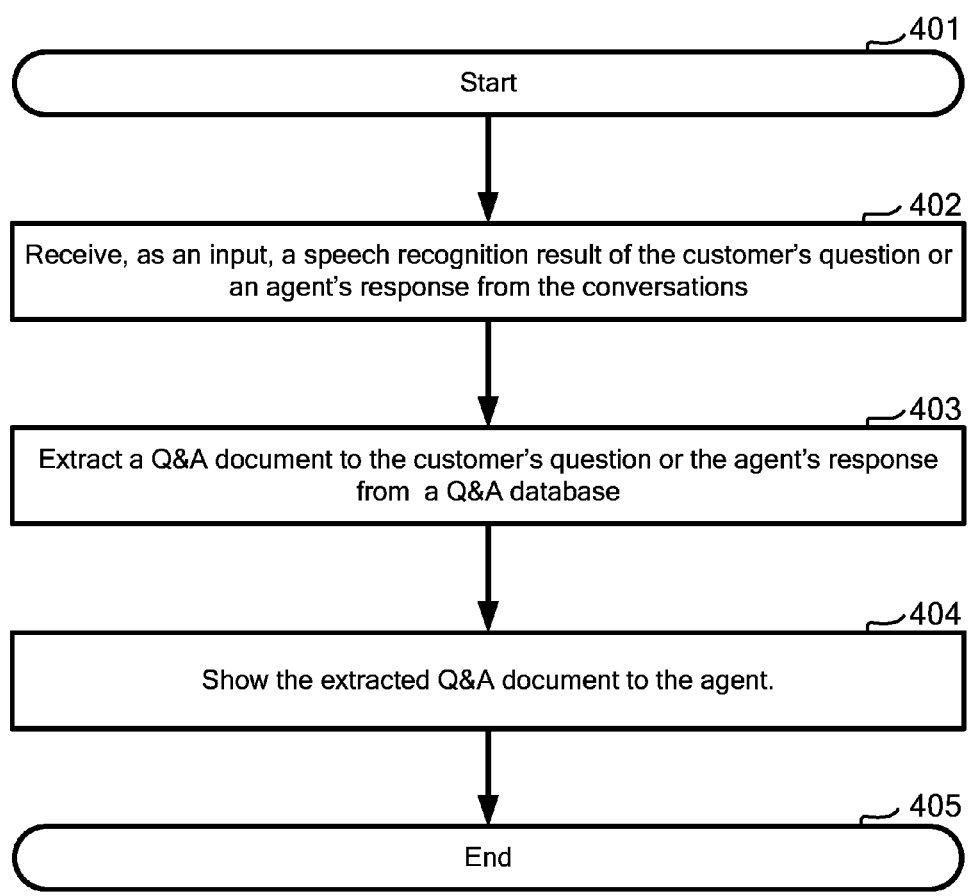
FIG. 4 illustrates an embodiment of a flowchart of a method for searching for an answer to a question of a customer.

FIG. 4 illustrates an embodiment of a flowchart of a method for searching for an answer to a question of a customer, using the expanded set of the Q&A documents, $F_1$, (292), or the expanded set of the Q&A documents, $F_2$, (293).

In step 401, the computer (101) starts the method described above.

In step 402, the computer (101) receives, as input, a speech recognition result of the customer's question or an agent's response or repetition parts from the conversations. The speech recognition result can be obtained at runtime.

In step 403, the computer (101) extracts a Q&A document to the customer's question or the agent's response from a QADB, using the expanded set of the Q&A documents, $F_1$, (292), or the expanded set of the Q&A documents, $F_2$, (293).

In step 404, the computer (101) shows the extracted Q&A document to the agent.

Accordingly, the agent can quickly obtain the Q&A document for the customer's question. In one embodiment, a few hundred terms, such as 100 to 300 words, or 150 to 250 words, or approximately 200 words, in the beginning of an agent's response in the conversation or the customer's question in the conversation may be used as input of the search method, using the expanded set of the Q&A documents, $F_1$, (292), or the expanded set of the Q&A documents, $F_2$, (293) to obtain the result, namely Q&A document corresponding to the customer's question.

In step 405, the computer (101) terminates the method described above.

FIGS. 5A to 5E illustrate embodiments of data used in the flowchart or generated according to an embodiment of the flowchart.

With reference now to FIG. 5A, FIG. 5A illustrates an embodiment of the QADB (501).

The QADB (501) comprises a plurality of Q&A documents. Each Q&A document has F[x], Q&A ID and description. The F[x] may be used to specify the number of each Q&A document. The Q&A ID may be used to classify the Q&A document, according to predefined classifications or predefined categories. The description may include a title of a Q&A document, a question and an answer corresponding to the question. The description may be described as an XML, a HTML or an XHTML.

With reference now to FIG. 5B, FIG. 5B illustrates an embodiment of the call logs (511).

Each of the call logs (511) has Cs[i][j], Q&A ID and speech recognition results, or one or more utterances. The Cs[i][j] may be used to specify the number of each log. The Q&A ID may be common with the identifier of a relevant Q&A document. The Q&A ID of each call log may be manually assigned by an agent, for example, after a conversation between a customer and the agent was finished. For example, the agent can assign an identifier to each call log by combining the Q&A document which was used for the conversation or inputting the Q&A ID of the Q&A document which was used for the conversation. By an assignment of the identifier common with the identifier of the Q&A document to each call log, the call log is associated with the Q&A document.

For example, if the number of the call logs is five hundred, Cs[i][j] to Cs[100][j] may be used as Cs (512), and Cs[101][j] to Cs[500][j] may be used as Cp (513).

FIG. 5C illustrates an embodiment of associated identifiers among Q&A documents.

The QADB (521) comprises a plurality of Q&A documents.

The Q&A documents having ID Nos. 201, 202 and 203 are the associated Q&A documents for wire transfer.

The Q&A documents having ID Nos. 211, 212 and 213 are the associated Q&A documents for paying tax.

The association information may be stored, for example, in the table (525).

FIG. 5D illustrates an embodiment of rules for extracting repetition parts from speech recognition results.

The rule R[k] is listed in the table (531). The table (531) includes Rules R[1] to R[n]. Examples of rules are explained below.

Rule R[1] is "I UNDERSTAND (.*) <END_OF_SENTENCE>". Rule R[1] is used for selecting repetition part including the terms, "I understand" from the call log Cs.

Rule R[2] is "LET ME CONFIRM THAT (.*) <END_OF_SENTENCE>". Rule R[2] is used for selecting repetition part including the terms, "LET ME CONFIRM THAT" from the call log Cs.

Rule R[3] is "YOU WANT TO (.*) <END_OF_SENTENCE>". Rule R[3] is used for selecting repetition part including the terms, "YOU WANT TO" from the call log Cs.

Rule R[4] is "YOU SAID THAT YOU (.* WHEN .*) <END_OF_SENTENCE>". Rule R[4] is used for selecting repetition part including the terms, "YOU SAID THAT YOU" from the call log Cs.

FIG. 5E illustrates an embodiment of an original Q&A database and Q&A databases expanded according to one embodiment of the flowcharts described in FIG. 2A.

The Q&A document (541) illustrates an original Q&A document, F.

The Q&A document (542) illustrated an expanded Q&A document, $F_1$, which comprises repetition parts extracted from the speech recognition results of the agent's utterances, "I UNDERSTAND. OK. D_AH YOU'VE ALREADY MOVED TO NEW ADDRESS. OK. D_AH YOU WANT TO KNOW THE NEW BRANCH CLOSE TO YOUR NEW ADDRESS. YOU LOST THE PASSWORD AND YOU WANT TO REISSUE THE PASSWORD." in addition to the original Q&A document, F (541).

The Q&A document (543) illustrated an expanded Q&A document, $F_2$, which comprises repetition parts extracted from the speech recognition results of the agent's utterances, "OKAY. YOU LOST CREDIT CARD. YOU MAY LOST CREDIT CARD. THIS PROCEDURE IS STOP THE CARD FOR YOUR SAFETY TILL YOUR CARD WILL BE FOUND. IF YOU PREFER WE INVALIDATE YOUR CARD NOW AND START TO ISSUE NEW CARD.", "OKAY. YOU FOUND THE CARD THAT WE'VE STOPPED SINCE YOU WANT TO REVALIDATE CARD. IT' OK FOR YOU WE UNDERSTAND. YOU APPLIED THE CARD. BUT YOU CAN'T RECEIVE THE CARD. YOU MOVED. BUT YOUR CARD HAS NOT BEEN RETURNED. LET ME CHECK THE HISTORY OF THE PROCEDURE." and "WE ACCEPTED THE CARD. YOU CAN'T FIND THE CARD. YOU WANT TO STOP THE SERVICE TO THE CARD. NOW WE START THE PROCEDURE TO STOP YOUR CARD. IT MAY TAKE EFFECT IN ONE HOUR." in addition to the expanded Q&A document, $F_1$ (542).

The FIG. 6 illustrates an embodiment of an original Q&A database and Q&A databases expanded according to another embodiment of the flowcharts described in FIG. 3.

The Q&A document (601) illustrates an original Q&A document.

The Q&A document (602) illustrated an expanded Q&A document which comprises all of the speech recognition results of the agent's utterances, which can be seen in FIG. 5B, in addition to the original Q&A document (601).

FIG. 7 illustrates an embodiment of calculating a similarity with the Q&A documents, by using a similarity search index.

Let us suppose the Q&A document, $F_1[295]$ (701). The contents of $F_1[295]$ (701) is shown in Table (702) and corresponds to the Q&A document (542).

Table (721) shows a similarity search index which is generated from call logs, Cp[1][1]-Cp[Np][ . . . ].

Table (711) shows a vector generated from the Q&A document, $F_1[295]$ (701), in the expanded set $F_1$.

Table (741) shows a similarity with $F_1[295]$ between the vector shown in Table (711) and the vector of each log shown in the Table (721).

When the predetermined threshold is set to 0.200, the logs, Cp[203][13] and Cp[497] [23] are extracted as output.

Figure 8:
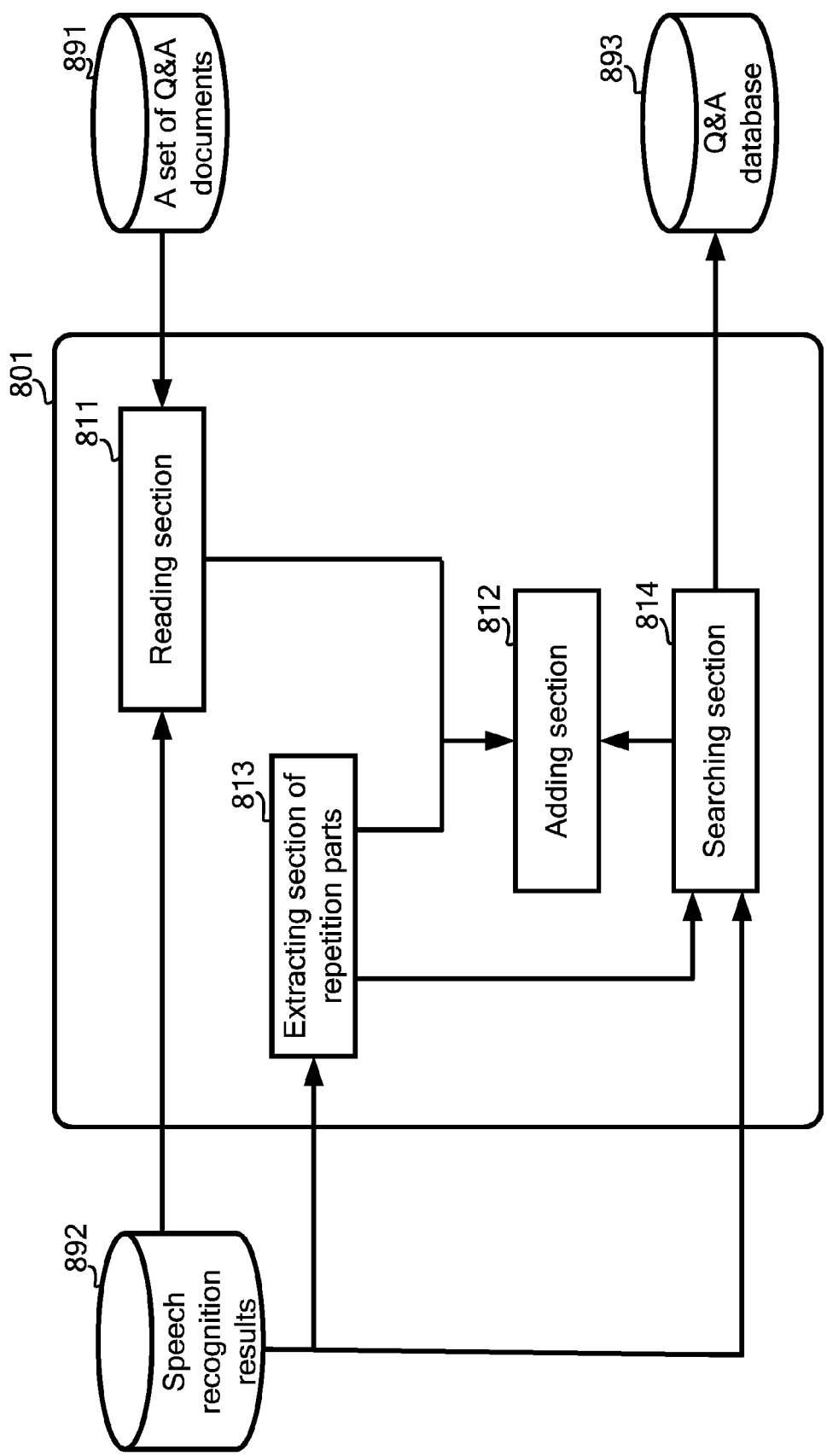
FIG. 8 illustrates an embodiment of an overall functional block diagram of a computer system hardware used in accordance with an embodiment of the flowchart described in FIG. 2A.

FIG. 8 illustrates an embodiment of an overall functional block diagram of a computer system hardware used in accordance with an embodiment of the flowchart described in FIG. 2A.

A computer (801) may correspond to the computer (101).

The computer (801) comprises a reading section (811) and an adding section (812). Further, the computer (801) may optionally comprise an extracting section of repetition parts (812), a searching section (814) or a combination of these.

The reading section (811) may prepare a set of Q&A documents and speech recognition results of at least agent's utterances in conversations between the agent and a customer.

The reading section (811) may perform step 202 described in FIG. 2A, step 222 described in FIG. 2C, and step 302 described in FIG. 3.

The adding section (812) may add one or more repetition parts extracted from the speech recognition results of the agent's utterances to a corresponding Q&A document in the set. The adding section (812) may further add the one or more found utterances to the corresponding Q&A document.

The adding section (812) may perform steps 203 and 205 described in FIG. 2A, step 218 described in FIG. 2B, and step 303 described in FIG. 3.

The extracting section of repetition parts (813) may extract based on one or more rules for extracting one or more repetition parts, one or more repetition parts of the agent from the prepared speech recognition results.

The extracting section of repetition parts (813) may perform steps 212 to 217 described in FIG. 2B.

The searching section (814) may search for one or more utterances similar to each of the one or more extracted repetition parts from the prepared speech recognition results.

The searching section (814) may perform steps 223 to 226 described in FIG. 2C.

Figure 9:
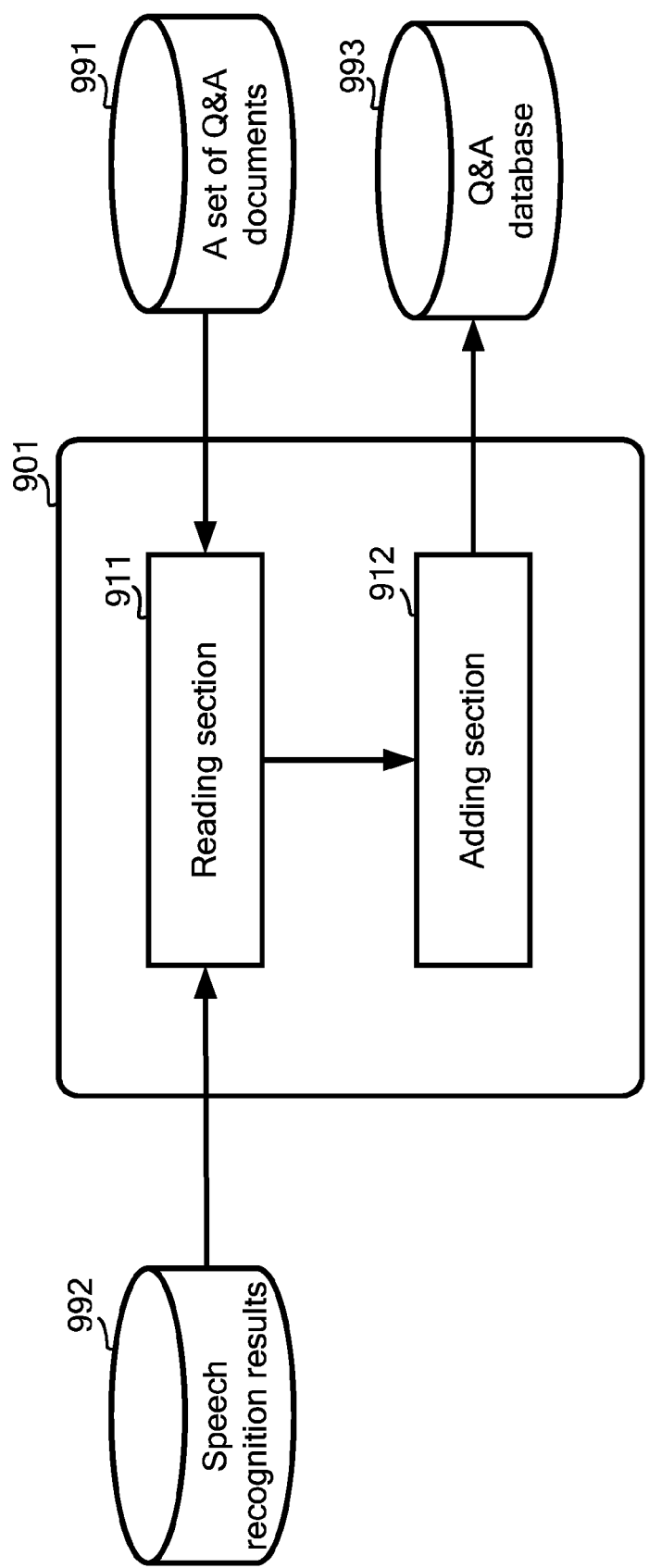
FIG. 9 illustrates an embodiment of an overall functional block diagram of a computer system hardware used in accordance with an embodiment of the flowchart described in FIG. 3.

FIG. 9 illustrates an embodiment of an overall functional block diagram of a computer system hardware used in accordance with one embodiment of the flowchart described in FIG. 3.

A computer (901) may correspond to the computer (101).

The computer (901) comprises a reading section (911) and an adding section (912).

The reading section (911) may prepare a set of Q&A documents and speech recognition results of agent's utterances in conversations between the agent and a customer.

The reading section (911) may perform step 302 described in FIG. 3.

The adding section (912) may add the speech recognition results of the agent's utterances to a corresponding Q&A document in the set.

The adding section (912) may perform step 303 described in FIG. 3.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

Having described preferred embodiments of a system and method for expanding a question and answer (Q&A) database (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for expanding a question and answer (Q&A) database to improve computer database search functionality, the method comprising:
  preparing a set of Q&A documents and speech recognition results of utterances of at least an agent during conversations between the agent and a customer, each Q&A document in the set having an identifier, and each speech recognition result having an identifier common with the identifier of a relevant Q&A document, wherein preparing the speech recognition results comprises analyzing recordings of the conversations between the agent and the customer;
  extracting one or more repetition parts from the analyzed recordings;
  finding one or more utterances similar to each of the one or more extracted repetition parts; and
  adding the one or more repetition parts and the one or more found utterances to a corresponding Q&A document in the set to generate an expanded set of Q&A documents, the expanded set of Q&A documents being stored in an enhanced computer database to increase accuracy of Q&A document extraction in response to receipt of a search query.

2. The method according to claim 1, wherein adding the one or more found utterances further comprises:
  searching for one or more utterances having a similarity equal to or greater than a predetermined threshold value for each of the one or more extracted repetition parts; and
  extracting one or more utterances which have an identifier common with the identifier of each of the one or more extracted repetition parts from the one or more found utterances having a similarity equal to or greater than the predetermined threshold value.

3. The method according to claim 1, wherein adding the one or more found utterances further comprises:
  extracting one or more utterances which have an identifier common with the identifier of each of the one or more extracted repetition parts; and searching for one or more utterances having a similarity equal to or greater than a predetermined threshold value for each of the one or more extracted repetition parts.

4. The method according to claim 1, wherein the prepared speech recognition results include utterances of each of the agent and the customer.

5. The method according to claim 1, wherein the corresponding Q&A document includes an identifier common with an identifier of the one or more extracted repetition parts or an identifier common with an identifier associated with the identifier of the one or more extracted repetition parts.

6. The method according to claim 1, wherein the one or more repetition parts are extracted based on one or more rules for extracting the one or more repetition parts.

7. The method according to claim 1, wherein the relevant Q&A document is a search result obtained by using the speech recognition result as input.

8. A system, comprising:
a memory storing a program which, when executed on a processor, performs a method for expanding a question and answer (Q&A) database to improve computer database search functionality, the method comprising:
preparing a set of Q&A documents and speech recognition results of utterances of at least an agent during conversations between the agent and a customer, each Q&A document in the set having an identifier, and each speech recognition result having an identifier common with the identifier of a relevant Q&A document, wherein preparing the speech recognition results comprises analyzing recordings of the conversations between the agent and the customer;
extracting one or more repetition parts from the analyzed recordings;
finding one or more utterances similar to each of the one or more extracted repetition parts; and
adding the one or more repetition parts and the one or more found utterances to a corresponding Q&A document in the set to generate an expanded set of Q&A documents, the expanded set of Q&A documents being stored in an enhanced computer database to increase accuracy of Q&A document extraction in response to receipt of a search query.

9. The system according to claim 8, wherein adding the one or more found utterances further comprises:
searching for one or more utterances having a similarity equal to or greater than a predetermined threshold value for each of the one or more extracted repetition parts; and
extracting one or more utterances which have an identifier common with the identifier of each of the one or more extracted repetition parts from the one or more utterances having a similarity equal to or greater than the predetermined threshold value.

10. The system according to claim 8, wherein adding the one or more found utterances further comprises:
extracting one or more utterances which have an identifier common with the identifier of each of the one or more extracted repetition parts; and
searching for one or more utterances having a similarity equal to or greater than a predetermined threshold value for each of the one or more extracted repetition parts.

11. The system according to claim 8, wherein the prepared speech recognition results include utterances of each of the agent and the customer.

12. The system according to claim 8, wherein the corresponding Q&A document includes an identifier common with an identifier of the one or more extracted repetition parts or an identifier common with an identifier associated with the identifier of the one or more extracted repetition parts.

13. The system according to claim 8, wherein the one or more repetition parts are extracted based on one or more rules for extracting the one or more repetition parts.

14. The system according to claim 8, wherein the relevant Q&A document is a search result obtained by using the speech recognition result as input.

15. A computer program product for expanding a question and answer (Q&A) database to improve computer database search functionality, the computer program product comprising a computer usable storage medium having program instructions embodied therewith, wherein the computer readable storage medium is not a transitory signal per se, the program instructions executable by a computer to cause the computer to perform a method comprising:
preparing a set of Q&A documents and speech recognition results of utterances of at least an agent during conversations between the agent and a customer, each Q&A document in the set having an identifier, and each speech recognition result having an identifier common with the identifier of a relevant Q&A document, wherein preparing the speech recognition results comprises analyzing recordings of the conversations between the agent and the customer;
extracting one or more repetition parts from the analyzed recordings;
finding one or more utterances similar to each of the one or more extracted repetition parts; and
adding the one or more repetition parts and the one or more found utterances to a corresponding Q&A document in the set to generate an expanded set of Q&A documents, the expanded set of Q&A documents being stored in an enhanced computer database to increase accuracy of Q&A document extraction in response to receipt of a search query.

16. The computer program product according to claim 15, wherein adding the one or more found utterances further comprises:
searching for one or more utterances having a similarity equal to or greater than a predetermined threshold value for each of the one or more extracted repetition parts; and
extracting one or more utterances Which have an identifier common with the identifier of each of the one or more extracted repetition parts from the one or more utterances having a similarity equal to or greater than the predetermined threshold value.

17. The computer program product according to claim 15, wherein adding the one or more found utterances further comprises:
extracting one or core utterances which have an identifier common with the identifier of each of the one or more extracted repetition parts; and
searching for one or more utterances having a similarity equal to or greater than a predetermined threshold value for each of the one or more extracted repetition parts.

18. The computer program product according to claim 15, wherein the prepared speech recognition results include utterances of each of the agent and the customer.

19. The computer program product according to claim 15, wherein the corresponding Q&A document includes an identifier common with an identifier of the one or more extracted repetition parts or an identifier common with an identifier associated with the identifier of the one or more extracted repetition parts.

20. The computer program product according to claim 15, wherein the one or more repetition parts are extracted based on one or more roles for extracting the one or more repetition parts.

21. A computer-implemented method for searching for an answer to a question of a customer to improve computer database search functionality, based on conversations between an agent and the customer, the method comprising:
receiving, as input, a speech recognition result of the question or a response to the question from the agent;
extracting, using a processor, a Q&A document relevant to the question or the response from an expanded question and answer (Q&A) database generated according claim 1; and
displaying the extracted Q&A document to the agent.

\* \* \* \* \*